(12) United States Patent
Coresh

(10) Patent No.: US 9,616,584 B2
(45) Date of Patent: Apr. 11, 2017

(54) SHAVING RAZOR AND SHAVING HANDLE WITH AN INTERCONNECTION MECHANISM

(71) Applicant: Alon Leon Coresh, Marina del Rey, CA (US)

(72) Inventor: Alon Leon Coresh, Marina del Rey, CA (US)

(73) Assignee: Rolling Razor, Inc., Los Angeles, CA (US)

( * ) Notice: Subject to any disclaimer, the term of this patent is extended or adjusted under 35 U.S.C. 154(b) by 153 days.

(21) Appl. No.: 14/221,086

(22) Filed: Mar. 20, 2014

(65) Prior Publication Data

US 2015/0266192 A1    Sep. 24, 2015

(51) Int. Cl.
| | | |
|---|---|---|
| *B26B 21/52* | (2006.01) | |
| *B26B 21/22* | (2006.01) | |
| *B29C 45/14* | (2006.01) | |
| *B29K 77/00* | (2006.01) | |
| *B29L 31/00* | (2006.01) | |
| *B29K 221/00* | (2006.01) | |

(52) U.S. Cl.
CPC .......... *B26B 21/521* (2013.01); *B26B 21/222* (2013.01); *B26B 21/528* (2013.01); *B29C 45/14* (2013.01); *B29K 2077/00* (2013.01); *B29K 2221/003* (2013.01); *B29L 2031/7186* (2013.01)

(58) Field of Classification Search
CPC ... B26B 21/222; B26B 21/521; B26B 21/528; B26B 21/225; B26B 21/227; B26B 21/52; B26B 21/522

USPC ........................................... 30/526–535
See application file for complete search history.

(56) References Cited

U.S. PATENT DOCUMENTS

| | | | | |
|---|---|---|---|---|
| 3,644,992 A | * | 2/1972 | Bennett ................ | B26B 21/165 30/526 |
| 3,918,155 A | * | 11/1975 | Atkins .................. | B26B 21/16 30/541 |
| 3,935,639 A | * | 2/1976 | Terry .................... | B26B 21/225 30/532 |

(Continued)

FOREIGN PATENT DOCUMENTS

| | | | |
|---|---|---|---|
| CA | 2356571 A1 | * | 4/2002 |
| CA | 2942900 A1 | * | 9/2015 |

(Continued)

OTHER PUBLICATIONS

International Search Report and Written Opinion of the ISA in PCT Application No. PCT/US2015/018823 dated Jun. 4, 2015. 7 pages.

*Primary Examiner* — Jason Daniel Prone
(74) *Attorney, Agent, or Firm* — Thomas Coester Intellectual Property

(57) ABSTRACT

A reduced cost interconnection for shaving razor cartridges. A base member is injection molded as a single continuous mass. The base member defines at least one void that may receive a mass increasing member. The base member has a handle portion integrally formed with a living hinge and an interconnection feature. The interconnection feature is biased to detachably engage a counterpart interconnection feature of a blade cartridge. Elastomeric reinforcement in over molded onto the base member to improve the structural integrity of the living hinge.

7 Claims, 5 Drawing Sheets

(56) References Cited

U.S. PATENT DOCUMENTS

| | | | | |
|---|---|---|---|---|
| 4,413,411 A * | 11/1983 | Trotta | B26B 21/521 | 30/526 |
| 4,422,237 A * | 12/1983 | Trotta | B26B 21/521 | 30/526 |
| 4,446,619 A * | 5/1984 | Jacobson | B26B 21/521 | 30/47 |
| 4,488,357 A * | 12/1984 | Jacobson | B26B 21/225 | 30/527 |
| 4,797,998 A * | 1/1989 | Motta | B26B 21/225 | 30/530 |
| 5,038,472 A * | 8/1991 | Iderosa | B26B 21/521 | 30/527 |
| 5,050,301 A * | 9/1991 | Apprille, Jr. | B26B 21/225 | 30/529 |
| 5,107,590 A * | 4/1992 | Burout, III | B25G 1/10 | 30/526 |
| 5,206,995 A * | 5/1993 | Min | B26B 21/225 | 30/527 |
| 5,331,740 A * | 7/1994 | Carson, III | B26B 21/222 | 30/526 |
| 5,469,621 A * | 11/1995 | Alsept | B26B 21/222 | 30/50 |
| 5,560,106 A * | 10/1996 | Armbruster | B26B 21/522 | 30/526 |
| 5,855,071 A * | 1/1999 | Apprille, Jr. | B26B 21/225 | 30/526 |
| 6,026,577 A * | 2/2000 | Ferraro | B26B 21/521 | 30/526 |
| 6,115,924 A * | 9/2000 | Oldroyd | B26B 21/225 | 30/526 |
| 6,311,400 B1 * | 11/2001 | Hawes | B26B 21/225 | 30/527 |
| 6,425,184 B1 * | 7/2002 | Min | B26B 21/225 | 30/526 |
| 6,615,498 B1 * | 9/2003 | King | B26B 21/225 | 30/527 |
| 6,886,262 B2 * | 5/2005 | Ohtsubo | B26B 21/522 | 30/526 |
| 6,990,740 B2 * | 1/2006 | Follo | B26B 21/521 | 30/527 |
| 7,100,284 B2 * | 9/2006 | King | B26B 21/225 | 30/49 |
| D619,763 S * | 7/2010 | Coresh | D28/48 | |
| 8,096,054 B2 * | 1/2012 | Denkert | B26B 21/225 | 30/527 |
| D654,222 S * | 2/2012 | Coresh | D28/48 | |
| 8,435,433 B2 * | 5/2013 | Pennell | A46B 5/02 | 264/247 |
| 8,479,398 B2 * | 7/2013 | Coresh | B26B 21/227 | 30/50 |
| 8,671,577 B2 * | 3/2014 | Brown | B26B 21/225 | 30/526 |
| 8,739,411 B2 * | 6/2014 | Kinghorn | B26B 21/42 | 30/526 |
| 8,745,876 B2 * | 6/2014 | Hage | B26B 21/10 | 30/528 |
| 9,144,914 B2 * | 9/2015 | Coresh | B26B 21/22 | 30/527 |
| 2002/0189112 A1 * | 12/2002 | Peyser | B26B 21/521 | 30/527 |
| 2005/0172493 A1 | 8/2005 | Fischer et al. | | |
| 2008/0216329 A1 * | 9/2008 | Leventhal | A45D 27/00 | 30/527 |
| 2009/0199406 A1 * | 8/2009 | Gratsias | B26B 21/38 | 30/526 |
| 2010/0031510 A1 * | 2/2010 | Gester | B26B 21/48 | 30/526 |
| 2010/0205808 A1 * | 8/2010 | King | A45D 27/225 | 30/34.2 |
| 2011/0016724 A1 * | 1/2011 | Murgida | B26B 21/22 | 30/50 |
| 2011/0088269 A1 * | 4/2011 | Walker, Jr. | B26B 21/225 | 30/527 |
| 2014/0068953 A1 * | 3/2014 | Wonderley | B26B 21/521 | 30/527 |
| 2014/0259693 A1 * | 9/2014 | Gropl | B26B 25/005 | 30/278 |
| 2015/0266191 A1 * | 9/2015 | Maimone | B26B 21/52 | 30/527 |
| 2015/0290822 A1 * | 10/2015 | Haba | B26B 21/225 | 30/526 |
| 2015/0314465 A1 * | 11/2015 | Giannopoulos | B26B 21/222 | 30/532 |
| 2016/0023504 A1 * | 1/2016 | Shapiro | A47G 21/04 | 30/526 |
| 2016/0089800 A1 * | 3/2016 | Coresh | B26B 21/38 | 30/45 |
| 2016/0151925 A1 * | 6/2016 | Gers-Barlag | B26B 21/225 | 30/527 |
| 2016/0250760 A1 * | 9/2016 | Phoon | B26B 19/386 | 30/526 |
| 2016/0250764 A1 * | 9/2016 | Hashimoto | B26B 21/521 | 30/526 |
| 2016/0263758 A1 * | 9/2016 | Wilson | B26B 21/225 | 30/526 |

FOREIGN PATENT DOCUMENTS

| | | | |
|---|---|---|---|
| DE | 3042664 A1 * | 6/1981 | |
| DE | 29511444 U1 * | 9/1995 | |
| WO | WO-9709155 A1 | 3/1997 | |
| WO | WO-2011011237 A1 | 1/2011 | |
| WO | WO 2015142526 A1 * | 9/2015 | |

* cited by examiner

SHAVING RAZOR AND SHAVING HANDLE WITH AN INTERCONNECTION MECHANISM

BACKGROUND

Field

Embodiments of the invention relate to shaving razors. More specifically, embodiments of the invention relate to shaving razors with a simplified cartridge interconnection feature.

Background

Many shaving razors with different handle formations exist. Some disposable razors without a replaceable blade cartridge have molded handle bolded to or formed as part of head into which one or more blades may be inserted. Such disposable razors are generally regarded as providing an inferior shave to razors with replaceable blade cartridges. The manner in which cartridges connect to the handle influences both manufacturing costs and shave quality. The existing razors generally use quite complex interconnection mechanisms typically involving numerous parts including springs, hooks, release buttons that are all discreetly formed and require separate manufacture and assembly. This increases the cost and complexity of the manufacturing process.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
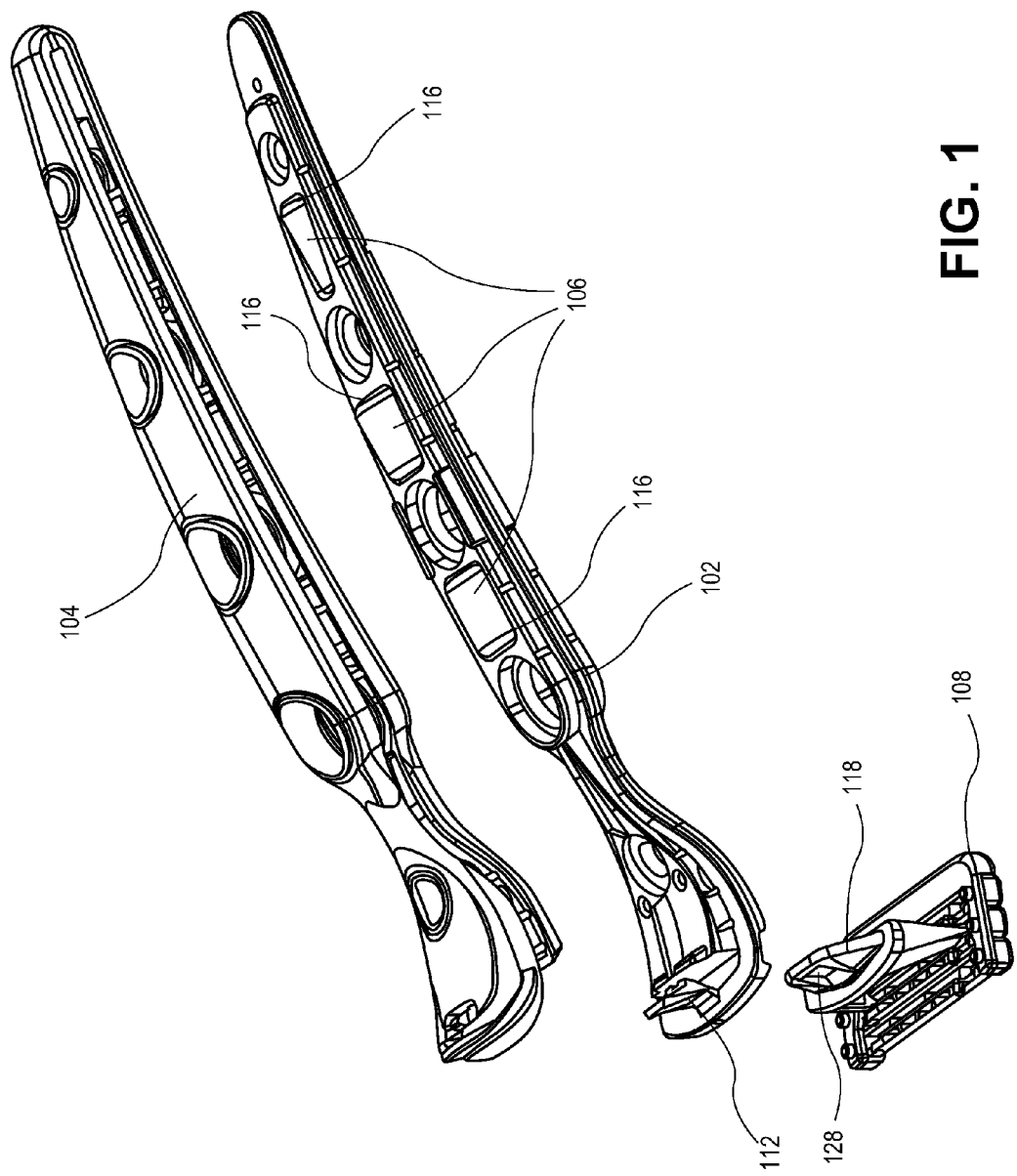
FIG. 1 is an exploded view of a razor of one embodiment of the invention.

FIG. 1 is an exploded view of a razor of one embodiment of the invention. A base member 102 is unitarily injection molded from a suitable thermoplastic. Suitable thermoplastics include resins having sufficient rigidity once cured to limit flexion of the handle such that good control of a razor cartridge attached thereto can be maintained. One suitable thermoplastic is glass-impregnated nylon with a glass content of 10-30% by weight of the mixture. This thermoplastic has been found to have suitable strength and rigidity characteristics to form a base layer for one embodiment of the instant invention.

Base member 102 defines one or more interior pockets 116 to receive mass increasing members 106 that increase the weight of the handle and therefore improve the tactile sensation for a user. In one embodiment, the pockets 116 are sized such that the weights retain the weights in a pressure fit relation such that the wall or ends of the pockets exert a force on the weight 106 to retain it with in the pocket. In one embodiment, the weights are inserted into the pockets after the base member 102 is injected and cured. In an alternative embodiment, the combined weights 106 and base 102 are formed by insert molding. While in the shown embodiment, three internal pockets 116 (and three weights 106) are present, other configurations of weights and pockets are within the scope and contemplation of the invention. Base member 102 also has formed as a part thereof, in the single molding operation, an interconnection feature 112 formed to engage a blade cartridge. Interconnection feature 112 is described in greater detail with respect to FIGS. 2 and 3 below.

In one embodiment, elastomeric reinforcement 104 is over molded onto base member 102 in a second injection during manufacture. The elastomeric reinforcement 104 improves the tactile sensation experienced by a user holding the razor and supports the interconnection feature 112 to reduce the risk that it becomes permanently deformed during use. Additionally, the elastomeric reinforcement 104 provides additional retention of weights 106 within pockets 116. It is preferred that weights 106 pressure fit into pockets 116 so that the elastomeric reinforcement is not the sole retaining feature, but the pressure fit is not essential to all embodiment of the invention.

A cartridge 108 includes a plurality of shaving blades that form part of a blade head. The blade head is coupled to an injection-molded yolk having a male member 118 extending therefrom. Male member 118 defines a recess 128 that can receive interconnection member 122. The shape and construction of the head can have myriad different forms including those described in copending application Ser. No. 13/173,911 or U.S. Pat. No. 8,479,398. The cartridge interconnection features, the male member 118 with defined recess 128, are independent of the form of the head.

Elastomeric reinforcement 104 is selected from a group of thermoplastic elastomers (TPE's) having favorable adhesive qualities relative to the thermoplastic selected for the base member. In one embodiment, the elastomer TC5PAZ available from Kraiburg TPE Corporation is selected. During manufacture the TPE is injected at high temperature, which improves the bonding characteristics with the base member 102. In addition to the natural adhesion between elastomeric reinforcement 104 and base member 102, base member 102 may define interstial voids into which the elastomeric resin flows during manufacture. The cured resin then further acts as an anchor within those interstial voids to prevent delamination of the elastomeric reinforcement 104 from base member 102.

Figure 2:
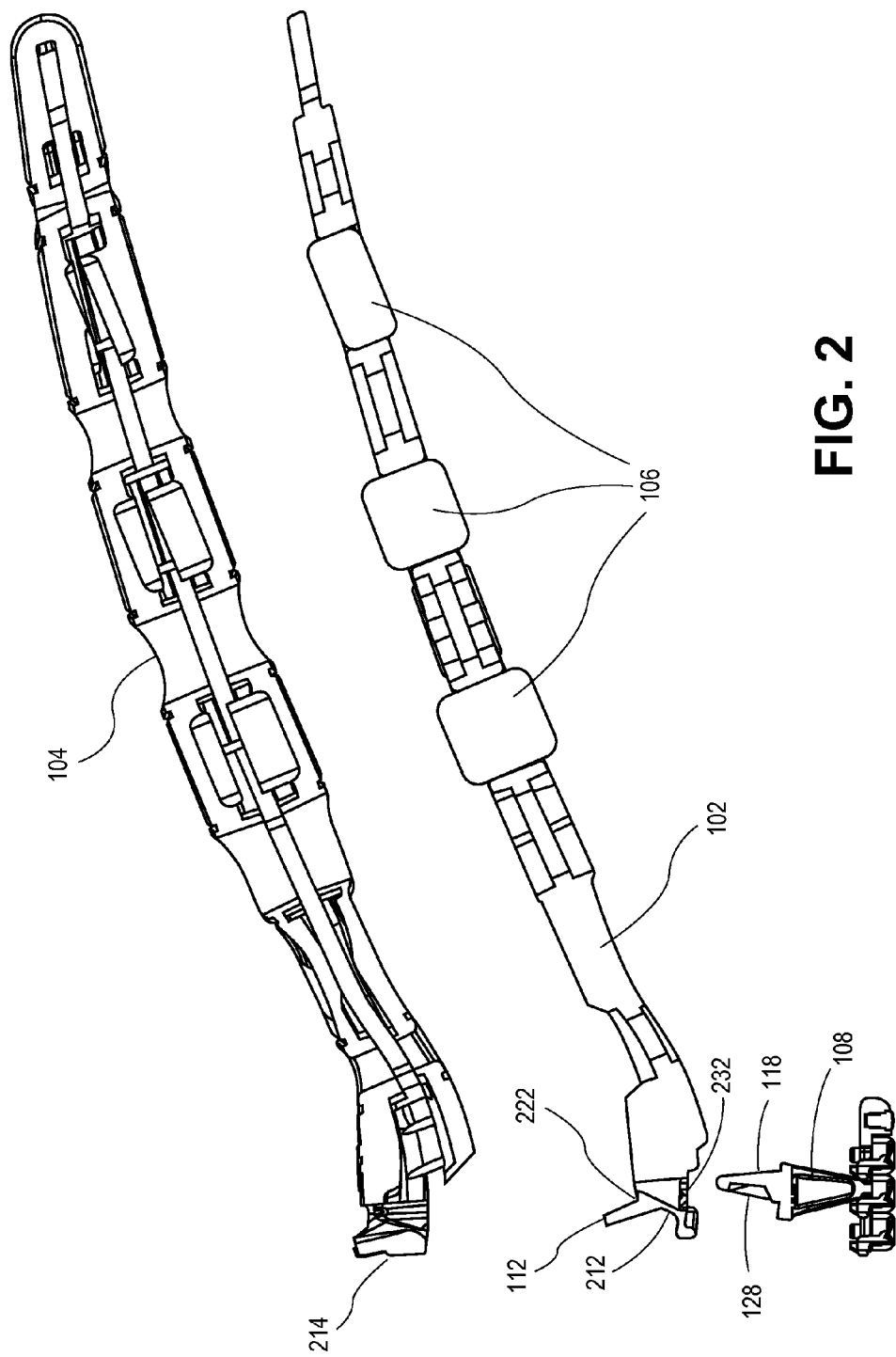
FIG. 2 is a sectional exploded view of the razor of FIG. 1.

FIG. 2 is a sectional exploded view of a razor of one embodiment of the invention. Base member 102 is shown with mass increasing members 106 residing in pockets therein. Additionally, a female receiver 232 defined by base member 102 can be seen. Female receiver 232 is dimensioned to receive male member 118 of blade cartridge 108. Interconnection member 112 includes a living hinge 212 and a tine 222. Living hinge 212 is manufactured to bias tine 222 into female receiver 232 such that when male member 118 is inserted into the female receiver 232 the tine 222 engages (seats within) recess 128.

Elastomeric reinforcement 104 includes a living hinge reinforcement portion 214 that supports the interconnection member 112. Portion 214 increases the bias of living hinge 212 into female receiver 232. Portion 214 also reduces the risk that living hinge 212 will move beyond the elastic region of the underlying material into the plastic region resulting in permanent deformation. It has been found that this construction allows the living hinge to endure thousands of cycles without breakage.

While in one embodiment, the living hinge 212 is supported by the elastomeric reinforcement portion 214, in other embodiments, other resilient members could be used. For example, a spring may reside in a spring housing that is molded as par of the base member. In one embodiment, the spring would reside forward of the living hinge and bias it toward the female receiver. In this context "forward" of the living hinge is deemed to mean the direction closer to the head end of the handle. The spring hosing may be sealed with a snap fit cover. Generally, the selected resilient member how ever constituted exerts a bias force on the living hinge as described and also helps to prevent permanent deformation of the interconnection member.

Figure 3:
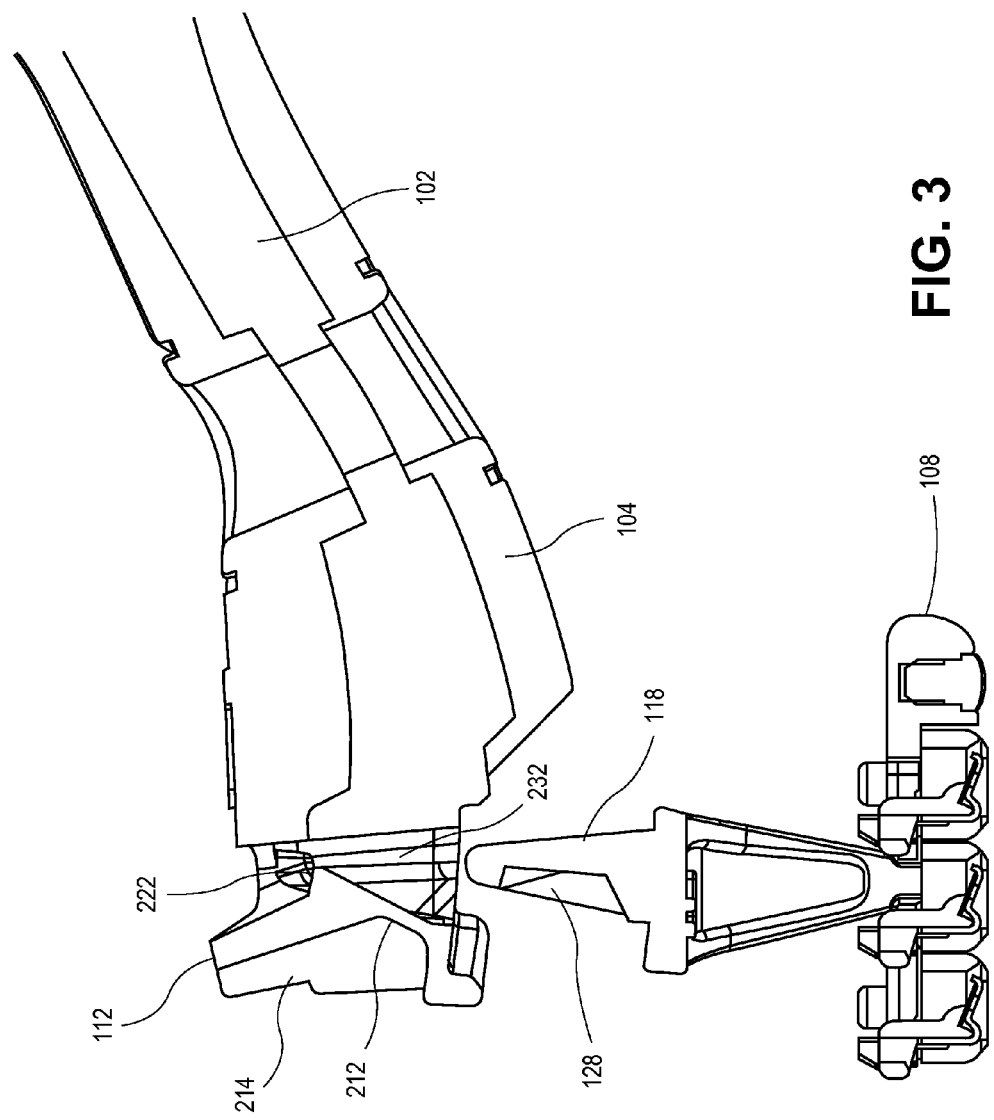
FIG. 3 is a sectional view illustrating the interconnection according to one embodiment of the invention.

FIG. 3 is a sectional view illustrating the interconnection according to one embodiment of the invention. In this Figure, elastomeric reinforcement member 104 is shown residing on base member 102. Interconnection feature 112 with its living hinge 212 can be seen with its tine 222 extending into female receiver 232. Interconnection reinforcement portion 214 is shown supporting living hinge 212 and the remainder of interconnection feature 112. When male member 118 of blade cartridge 108 is inserted into female receiver 232, living hinge 212 flexes to allow the leading edge of male member 118 to pass and then the bias force of living hinge 212 and reinforcement portion 214 bias the tine into engagement of recess 128. Blade cartridge 108 is then locked in place and ready for use. To remove the blade cartridge the user need merely apply force to interconnection feature 112 to overcome the bias force of living hinge 212 and reinforcement portion 214 to release the cartridge 108.

Figure 4:
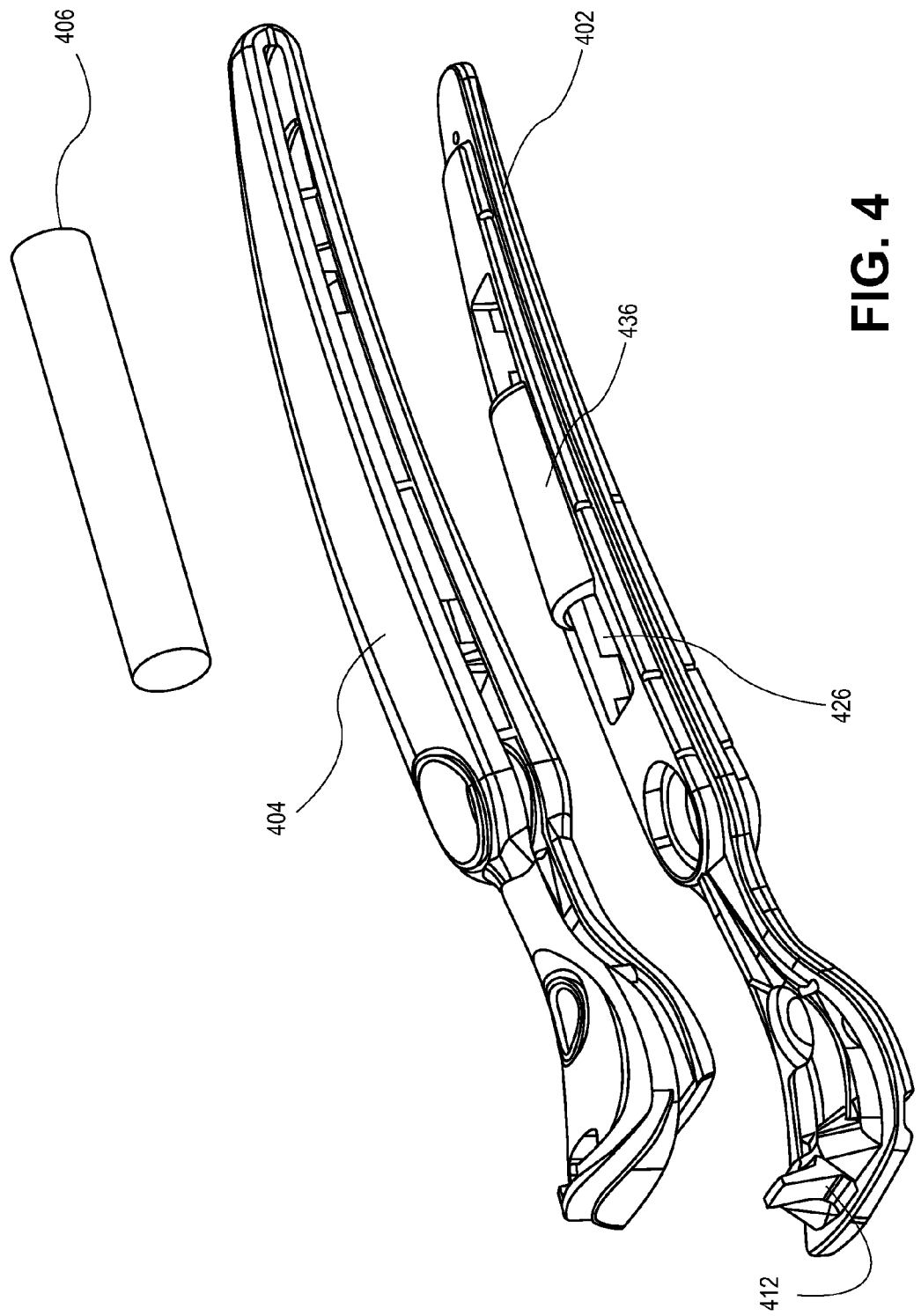
FIG. 4 is an exploded view of an alternative embodiment of the razor handle.

FIG. 4 is an exploded view of an alternative embodiment of the razor handle. In this embodiment, base member 402 defines a single pocket 426 to receive mass increasing member 406, pocket housing 436 provides additional structural support for weight 406. Weight 406 is pressure fit into pocket 426 after the molding of base layer 402. In one embodiment, weight 406 can be inserted directly into pocket 426 from the bottom side of member 402. After insertion the elastomeric reinforcement layer 404 is over molded onto base member 402. Interconnection feature 412 of base member 402 is identical to the analogous feature described with reference to FIGS. 1-3.

Figure 5:
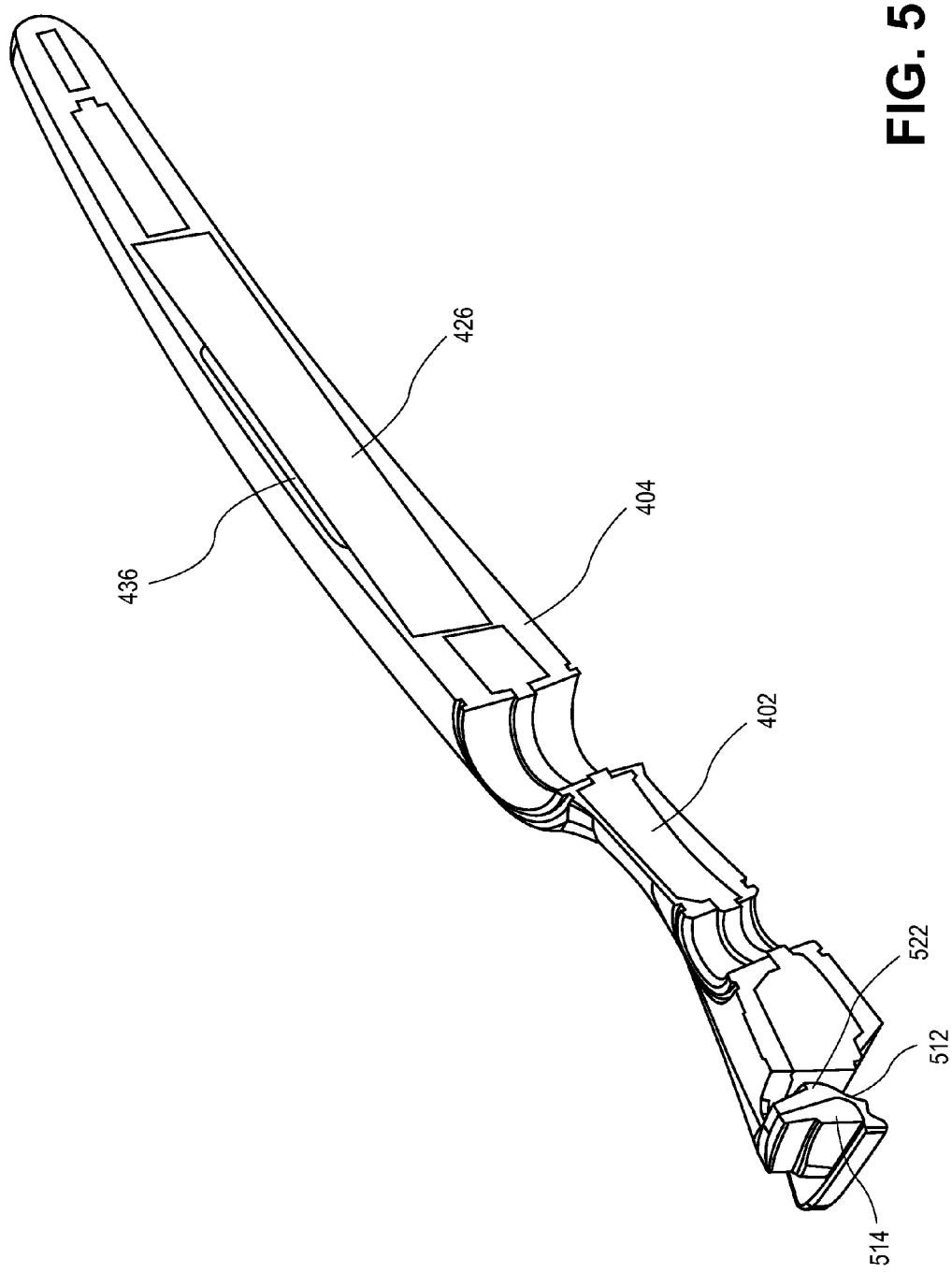
FIG. 5 is a cutaway view of a razor handle with the embodiment of FIG. 4.

FIG. 5 is a cutaway view of a razor handle with the embodiment of FIG. 4. Base layer 402 defines a weight pocket 426 and pocket housing 436 is molded as part thereof. In this view living hinge 512 and tine 522 of connection feature 412 can be seen. Elastomeric interconnection reinforcement portion 514 is also shown.

The described embodiments provide a high performance razor with an easy to use and low cost interconnection for replaceable blade cartridges. The handle is manufactured by injection molding, the base layer insertion of the weights within the one or more weight pockets defined within the base layer followed by the over molding of an elastomeric reinforcement layer. The simplicity of this manufacturing process yields a highly cost efficient product.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A razor comprising:
   a unitary injection molded base member defining an interconnection member to detachably engage a counterpart interconnection member of a blade cartridge at an engagement point, the base member further defining a void;
   a resilient elastomeric reinforcement overlying and coupled to the base member, the resilient reinforcement supporting the interconnection member proximate to the engagement point to increase the structural stability of the interconnection member of the base member proximate to the engagement point; and
   a mass increasing member disposed within the void and retained therein by the elastomeric reinforcement.

2. The razor of claim 1 wherein the base member defines a plurality of interstices engaged by the elastomeric reinforcement.

3. The razor of claim 1 where in the base member is formed of glass impregnated nylon.

4. The razor of claim 3 where in the glass is in the range of 10% to 30% by weight of the mixture.

5. The razor of claim 1 wherein the elastomeric reinforcement is formed of a thermoplastic elastomer.

6. The razor of claim 1 wherein the base is a thermoplastic and wherein the elastomeric reinforcement is bonded to the thermoplastic base.

7. The razor of claim 1 where in the base member defines a female insertion space to receive a male member of the blade cartridge, wherein the interconnection member resides within the female insertion space.

* * * * *